US006242556B1

(12) United States Patent
Markusch et al.

(10) Patent No.: US 6,242,556 B1
(45) Date of Patent: Jun. 5, 2001

(54) LIQUID MDI ADDUCTS WITH IMPROVED FREEZE STABILITY

(75) Inventors: Peter H. Markusch, McMurray, PA (US); Richard S. Pantone, Martinsville, WV (US); Ralf Guether, Pittsburgh, PA (US); William E. Slack, Moundsville, WV (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/499,603

(22) Filed: Feb. 7, 2000

(51) Int. Cl.$^7$ ..................................................... C08G 18/70
(52) U.S. Cl. ........................ 528/67; 252/182.22; 521/160
(58) Field of Search ............................... 252/182.22, 528; 528/67; 521/160

(56) References Cited

U.S. PATENT DOCUMENTS

| 3,152,162 | 10/1964 | Fischer et al. | 260/453 |
|---|---|---|---|
| 3,384,653 | 5/1968 | Emer et al. | 260/453 |
| 3,449,256 | 6/1969 | Farrissey, Jr. | 252/182 |
| 3,640,966 | 2/1972 | Hennig et al. | 260/77.5 R |
| 3,641,093 | 2/1972 | Brooks et al. | 260/453 AR |
| 3,644,457 | 2/1972 | König et al. | 260/453 SP |
| 3,701,796 | 10/1972 | Saaty et al. | 260/453 SP |
| 3,883,571 | 5/1975 | Allport et al. | 260/453 AM |
| 4,014,935 | 3/1977 | Ibbotson | 260/566 R |
| 4,031,026 | 6/1977 | Ibbotson | 252/182 |
| 4,055,548 | 10/1977 | Carleton et al. | 260/77.5 AT |
| 5,874,485 | * 2/1999 | Milliren | 521/160 |

FOREIGN PATENT DOCUMENTS

| 994890 | 6/1965 | (GB) . |
|---|---|---|
| 71-99176 | 9/1973 | (JP) . |

* cited by examiner

*Primary Examiner*—Rachel Gorr
(74) *Attorney, Agent, or Firm*—Joseph C. Gil; N. Denise Brown

(57) ABSTRACT

This invention relates to liquid polyisocyanate compositions having improved freeze stability. These liquid polyisocyanate compositions have an NCO group content of 15 to 30%, and comprise a blend of (A) an MDI adduct having an NCO group content of 15 to 30%, and (B) an allophanate-modified MDI having an NCO group content of 12 to 32.5%.

12 Claims, No Drawings

US 6,242,556 B1

LIQUID MDI ADDUCTS WITH IMPROVED FREEZE STABILITY

BACKGROUND OF THE INVENTION

This invention relates to a liquid polyisocyanate composition having an improved freeze stability which contain an NCO group content of 15 to 30%, and a monomeric diphenylmethane diisocyanate content of less than 90%. These compositions comprise a blend of (A) an MDI adduct having an NCO group content of 15 to 30%, and (B) an allophanate-modified MDI having an NCO group content of 12 to 32.5%.

Diisocyanates which are liquid at room temperature have numerous advantages over solid diisocyanates. The most commercially important diisocyanates which are solid at room temperature at 4,4'-diphenyl-methane diisocyanate and 2,4'-diphenylmethane diisocyanate. Numerous patents have issued relating to the liquification of diphenylmethane diisocyanates (MDI).

One common route to liquification of MDI is through carbodiimidizations. Typical of this route are the processes described in, for example, U.S. Pat. Nos. 3,152,162, 3,384, 653, 3,449,256, 3,640,966, 3,641,093, 3,701,796, 4,014,935 4,088,665, 4,154,752 and 4,177,205.

The most common technique to liquify MDI is through the reaction with various hydroxyl functional materials. The prior art has described numerous types of liquid isocyanates. These include both (1) reaction products of (i) MDI or modified MDI with (ii) hydroxyl functional materials such as are described in, for example, U.S. Pat. Nos. 3,644,457, 3,883,571, 4,229,347, 4,055,548, 4,102,833,4,332,742, 4,448,904, 4,490,301, 4,490,302, 4,539,156, 4,539,158, 4,883,909, 4,442,235 and 4,910,333, as well as (2) mixtures of (i) a reaction product of MDI or modified MDI and hydroxyl functional materials, with (ii) MDI, PMDI or modified MDI, such as are described in, for example, U.S. Pat. Nos. 4,031,026, 4,261,852, 4,321,333, 5,240,635 and 5,246,977.

U.S. Pat. No. 3,644,457 discloses organic diisocyanates and specifically, mixtures of organic diisocyanates which are liquid at room temperature. These compositions comprise the reaction product of solid 4,4'- and/or 2,4'-diphenylmethane diisocyanate with a branched aliphatic dihydroxy compound in a molar ratio of 0.1 to 0.3 mol of dihydroxy compound per mol of diisocyanate. Using the disclosed reaction conditions, allophanate formation by reaction of urethane groups with isocyanate groups does not occur in these isocyanate compositions.

U.S. Pat. Nos. 4,115,429 and 4,118,411 disclose low temperature (i.e., as low as −5° C.) storage stable liquid diphenylmethane diisocyanates. These are produced by reacting diphenylmethane diisocyanates having a specified 2,4'-isomer content with propylene glycol or poly-1,2-propylene ether glycol. High levels of the 2,4'-isomer result in the desirable low temperature stability, however, these products exhibit considerable lower reactivity and also property changes in the polyurethane elastomers (i.e. lower tensile strength).

Other liquid isocyanates are described in U.S. Pat. Nos. 4,490,300, 4,490,301 and 4,490,302. U.S. Pat. No. 4,490, 300 discloses reaction products of MDI with an aliphatic diol having a pendant aromatic groups, e.g., 2-methyl-2-phenyl-1,3-propanediol or phenyl-1,2-ethanediol. These liquid isocyanates are disclosed as being stable at room temperature. Other liquid isocyanates which are stable at room temperatures include those which comprise the reaction product of MDI with monoallylether of trimethylolpropane.

Liquid isocyanate reaction products are also disclosed by U.S. Pat. No. 4,490,302. These comprise the reaction products of MDI with mixtures of monoalcohols, poly-1,2-propylene ether glycols and low molecular weight triols.

U.S. Pat. No. 4,738,991 discloses organic polyisocyanates which are characterized by allophanate linkages. These polyisocyanates are prepared by reacting an organic polyisocyanate include, 2,4' and 4,4'-diphenylmethane diisocyanate with poly- or a monohydric alcohol in the presence of an organometallic catalyst. Deactivation of the catalyst is achieved using a compound such as an inorganic acid, organic acid, organic chloroformate or an organic acid chloride.

U.S. Pat. No. 4,866,103 discloses a polyisocyanate composition for use in producing elastomers in a RIM process. This composition is the product of reacting an alcohol or thiol having an average functionality of from about 1.5 to about 4 and an average equivalent weight of at least about 500 with at lest 2 equivalents per hydroxyl and/or thiol equivalent of an organic polyisocyanate including the 4.,4'- and the 2,4'-isomers of diphenylmethane diisocyanate. These products are formed under conditions such that at least about 20% of the initially formed urethane or thiourethane groups are converted to allophanate and/or thioallophanate groups.

Other references relating to the preparation of allophanates containing isocyanate include GB Patent 994,890. This reference relates to the reaction of urethane isocyanates with excess diisocyanate either by heat alone or in the presence of a catalyst such as a metal carboxylate, a metal chelate or a tertiary amine, until the isocyanate content is reduced to that which is obtained theoretically when the complete reaction of the urethane groups is achieved.

U.S. Pat. No. 4,160,080 discloses a process for producing allophanate containing aliphatically and/or cycloaliphatically bound isocyanate groups in which compounds containing urethane groups are reacted with polyisocyanates having aliphatic and/or cycloaliphatic isocyanate groups, in the presence of a strong acid. The process is generally conducted at a temperature of from 90° C. to 140° C. for about 4 to 20 hours.

A method of preparing liquid diphenylmethane diisocyanate, disclosed by Japanese Patent Application No.1971-99176, discloses reacting diphenylmethane diisocyanate with aliphatic monovalent alcohol.

Novel, liquid diphenylmethane diisocyanates which contain allophanate linkages are also disclosed by U.S. Pat. Nos. 5,319,053 and 5,319,054. The liquid stable products of U.S. Pat. No. 5,319,053 are characterized by an NCO group content of 12 to 32.5%, and comprise the reaction product of an aliphatic alcohol and a specified mixture of isomers of diphenylmethane diisocyanate. This reference also discloses stable liquid MDI prepolymers which comprise the reaction product of the allophanate-modified MDI as described above, with an organic material containing two or more active hydrogen groups. U.S. Pat. No. 5,319,054 describes liquid allophanate modified MDI compositions which are storage stable at 25° C. The diphenylmethane diisocyanate has a specific isomer distribution requiring 2–60% by weight of the 2,4'-diphenylmethane diisocyanate. The disclosed allophanate containing MDI prepolymers, although storage stable at 25° C., are substantially lower in reactivity with polyols when compared to stable liquid MDI's according to the present invention. Allophanate modified MDI's will also result in products with lower tensile strength at higher 2,4'diphenylmethane diisocyanate contents.

Allophanate modified diphenylmethane diisocyanate prepolymers are described in U.S. Pat. No. 5,440,003. These products are stable liquids at 25° C., and comprise the reaction product of an isomeric mixture of diphenylmethane diisocyanate and an aromatic alcohol such as phenol, with the resultant product being converted to the allophanate having an NCO group content of 12 to 32% by weight.

U.S. Pat. No. 5,663,272 discloses allophanate modified MDI which is a storage stable liquid at 25° C. These compositions are prepared by reacting a monoisocyanate and an organic material having at least two hydroxyl groups and a molecular weight of 60 to 6,000 to form a urethane. The urethane is then reacted with an isomeric mixture of MDI to form an isocyanate product having an NCO group content of from 12 to 30%. This allophanate-modified MDI can be further reacted with an organic isocyanate-reactive material to form an allophanate-modified MDI prepolymer containing urethane, urea and/or biuret groups having an NCO group content of 5 to 29%. The use of monofunctional compounds in polyurethane formulations including prepolymers results in chain termination which yields lower molecular weight polyurethanes with inferior physical properties.

Polyisocyanate mixtures which are liquid at temperatures greater than 5° C. are disclosed by U.S. Pat. No. 5,610,260. These polyisocyanates have an NCO content of 14.5 to 24% by weight and an allophanate group content of 7.7 to 14.5% by weight. The polyisocyanates described comprise reaction products of 4,4'-diphenylmethane diisocyanate with one or more monohydric alcohols having 4 to 16 carbon atoms at an NCO:OH equivalent ratio of 5:1 to 8.5:1, and a temperature of up to 160° C. to form urethane groups, and during or subsequent to urethane formation, converting the urethane groups in the presence of a catalyst to allophanate groups. Allophanate modified liquid MDI products made by this process provide improved low temperature stability but are slower in reactivity when compared with products of the present invention and result generally in polyurethane elastomers with lower hardness.

Advantages of the present invention include low temperature stability combined with desirable reactivity and provision of excellent physical properties (i.e., combination of hardness, elongation and tensile strength) in resulting polyurethane elastomers.

SUMMARY OF THE INVENTION

This invention relates to stable liquid polyisocyanate compositions characterized by improved freeze stability. These stable liquid polyisocyanate compositions have an NCO group content of from 15 to 30% (preferably of from 20 to 26%), contain less than 90% by weight of diphenylmethane diisocyanate, preferably less than 70% by weight, and comprise a blend of:
  (A) 10 to 90% by weight (preferably from 10 to 70%, more preferably from 20 to 50% by weight), based on 100% by weight of (A) and (B), of an MDI adduct having an NCO group content of 15 to 30%, and
  (B) 10 to 90% by weight (preferably from 30 to 90%, more preferably from 50 to 80% by weight), based on 100% by weight of (A) and (B), of an allophanate-modified MDI, having an NCO group content of 12 to 32.5%.

Suitable MDI adducts having an NCO group content of 15 to 30% to be used as component (A) of the present invention are those comprising the reaction product of:
  (1) diphenylmethane diisocyanate containing from about 0 to about 20% by weight of the 2,4'-isomer, from about 0 to about 2% by weight of the 2,2'-isomer and the balance being the 4,4'-isomer, with
  (2) a low molecular weight branched aliphatic dihydroxy compound (preferably tripropylene glycol).

Suitable allophanate-modified MDI's to be used as component (B) in the present invention are those comprising the reaction product of:
  (1) diphenylmethane diisocyanate containing from about 0 to about 20% by weight of the 2,4'-isomer, from about 0 to about 2% by weight of the 2,2'-isomer and the balance being the 4,4'-isomer, and
  (2) an aliphatic alcohol.

The present invention also relates to a process for the preparation of a stable liquid polyisocyanate composition. This process comprises:
  (I) blending
    (A) 10 to 90% by weight, based on 100% by weight of (A) and (B), of an MDI adduct having an NCO group content of 15 to 30% by weight, and comprising the reaction product of:
      (1) diphenylmethane diisocyanate containing from about 0 to about 20% by weight of the 2,4'-isomer, from about 0 to about 2% by weight of the 2,2'-isomer, and the balance being the 4,4'-isomer, and
      (2) a low molecular weight branched aliphatic dihydroxy compound (preferably tripropylene glycol); and
    (B) 10 to 90% by weight, based on 100% by weight of (A) and (B), of an allophanate-modified MDI having an NCO group content of 12 to 32.5% and comprising the reaction product of:
      (1) diphenylmethane diisocyanate containing from about 0 to about 20% by weight of the 2,4'-isomer, from about 0 to about 2% by weight of the 2,2'-isomer and the balance being the 4,4'-isomer, and
      (2) an aliphatic alcohol.

DETAILED DESCRIPTION OF THE INVENTION

As used herein, with respect to the polyisocyanate compositions of the present invention, the term stable means that the polyisocyanate composition has no more than a 1% absolute change in the NCO content and no more than a 10% change in the viscosity when stored at 25° C. for 3 months, and the term liquid means that the polyisocyanate composition does not precipitate solids when stored at 25° C. for 3 months.

In accordance with the present invention, suitable compositions to be used as component (A) include MDI adducts having an NCO group content of from 15 to 30%, and preferably of from 20 to 26%.

Suitable (A) MDI adducts for the present invention include those comprising the reaction product of:
  (1) diphenylmethane diisocyanate containing from about 0 to about 20% by weight of the 2,4'-isomer, from about 0 to about 2% by weight of the 2,2'-isomer and the balance being the 4,4'-isomer; and
  (2) a low molecular weight branched aliphatic dihydroxy compound, and preferably tripropylene glycol.

The diphenylmethane diisocyanate suitable for component (A)(1) has the isomer distribution as set forth above, wherein the sum of the %'s by weight of 2,2'-isomer, 2,4'-isomer and 4,4'-isomer must total 100% by weight of the diphenylmethane diisocyanate (A)(1). It is preferred that the diphenylmethane diisocyanate contains from about 0 to 10% by weight of the 2,4'-isomer, from about 0 to about 1% by weight of the 2,2'-isomer, and the balance being the 4,4'-isomer. Most preferably, the MDI contains from about 0 to 3% by weight of the 2,4'-isomer, from about 0 to 0.2% by weight of the 2,2'-isomer and the balance being the 4,4'-isomer.

Suitable low molecular weight organic compounds to be used as component (A)(2) herein include, for example, branched aliphatic dihydroxy compounds such as, but not limited to compounds which contain at least two alkyl groups in the molecule such as 2-ethyl hexanediol-(1,3), 2-methyl-pentanediol-(2,4), 2,2,4-trimethylpentanediol-(1, 3), 3-methyl-5-ethyl-heptanediol-(2,4), 2-methyl-2-propanediol-(1,3) or mixtures thereof. It is preferred to use poly-1,2-propylene ether glycols of molecular weight 134 to 700, such as dipropylene glycol, tripropylene glycol or polypropylene glycol or mixtures thereof. Tripropylene glycol is particularly preferred.

The MDI adducts, i.e., component (A) of the present invention, can be prepared by the process as disclosed in, for example, U.S. Pat. No. 3,644,457, the disclosure of which is herein incorporated by reference.

Suitable components to be used as component (B), the allophanate-modified MDI have an NCO group content of 12 to 32.5%, preferably of 20 to 26%.

Suitable allophanate-modified MDI components to be used as component (B) of the present invention include those comprising the reaction product of:

(1) diphenylmethane diisocyanate containing from about 0 to about 20% by weight of the 2,4'-isomer, from about 0 to about 2% by weight of the 2,2'-isomer, and the balance being the 4,4'-isomer; and (2) an aliphatic alcohol.

Diphenylmethane diisocyanates suitable component (B) (1) of the allophanate-modified MDI, include those having an isomer distribution of from about 0 to about 20% by weight of the 2,4'-isomer, from about 0 to about 2% by weight of the 2,2'-isomer, and the balance being the 4,4'-isomer, wherein the sum of the %'s by weight of the 2,2'-, 2,4'- and 4,4'-isomers totals 100% by weight of the diphenylmethane diisocyanate (B)(1). It is preferred that the diphenylmethane diisocyanate contains from about 0 to about 20% by weight of the 2,4'-isomer, from about 0 to about 1% of the 2,2'-isomer, and the balance being the 4,4'-isomer. Most preferably, the MDI contains from about 0 to about 3% by weight of the 2,4'-isomer, from about 0 to about 0.2% by weight of the 2,2'-isomer and the balance being the 4,4'-isomer.

The useful aliphatic alcohols can contain about 1 to 36 and preferably 4 to 16 carbon atoms. Illustrative but non-limiting examples of the aliphatic alcohols can be selected from the group consisting of cycloaliphatic alcohols, aliphatic alcohols containing aromatic groups, aliphatic alcohols containing groups that do not react with isocyanates e.g., ether groups and halogens such as bromine and chlorine. Specific but non-limiting examples of the aliphatic alcohols can be selected from the group consisting of 2-methyl-1-propanol, cetylalcohol, cyclohexanol, 2-methoxy-ethanol, and 2-bromoethanol. Aliphatic alcohols for the present invention which are more preferred include the branched aliphatic alcohols such as, for example, isobutanol. Those branched aliphatic alcohols having relatively low molecular weights such as, for example, about 150 or less, are most preferred. Examples of these include isobutanol.

The allophanate modified MDI, i.e., component (B) of this invention, can be prepared by, for example, the process disclosed in U.S. Pat. Nos. 5,319,053 and 5,610,260, the disclosures of which are herein incorporated by reference.

The liquid MDI adducts with improved freeze stable according to the invention can be prepared by blending the allophanate group containing MDI with the MDI adduct prepared by reaction of MDI with a branched aliphatic dihydroxy compound at room temperature or elevated temperatures.

The two components can also first be blended at room temperature and then heated under agitation to i.e. 80° C. to obtain the optimal homogeneity. The resulting blends can then be stored at 25° C.

As used herein, the term improved freeze stability means that the polyisocyanate composition is a stable liquid at less than 20° C., and preferably at less than 15° C. for 30 days or more.

Applicants copending application Ser. No. 09/499,316, which is commonly assigned, also describes liquid MDI adducts having improved freeze stability. These compositions comprise the reaction product of (A) an allophanate-modified MDI having an NCO group content of 16 to 32.5%, (B) a low molecular weight branched aliphatic dihydroxy compound, and (C) an epoxide functional compound in an amount of from 0.01 to 1 % by weight, based on the combined weight of (A) and (B).

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples:

Isocyanate A: diphenylmethane diisocyanate having an isomer distribution comprising of about 98% by weight of the 4,4'-isomer, and less than 2% by weight of the 2,4'-isomer. This diisocyanate has an NCO content of about 33.6% and a functionality of 2.0.

Isocyanate B: an isocyanate prepolymer having an NCO group content of about 23%, a viscosity between 550 and about 800 mPa.s at 25° C. and comprising the reaction product of about 86.2% by weight of isocyanate A and about 13.8% by weight of tripropylene glycol. This prepolymer is stable for at least 30 days at temperatures of 20° C. or greater, but freezes below 15° C.

Isocyanate C: 100 parts (pbw) of isocyanate A and 7.76 parts of 2-methyl-1-propanol were charged to a stirred reactor and heated to 60° C. 0.01 part of zinc acetylacetonate was added and the stirred reaction mixture was heated to 90° C. After one hour at 90° C. the NCO content was 23%. The reaction mixture was cooled to 60° C. and 0.025 part of benzoyl chloride was added. The reaction mixture was then cooled to 25° C. This prepolymer has a viscosity between 400 and 650 mPa.s and is stable for at least 30 days at temperatures of 5° C. or greater.

Polyol 1: a propylene glycol started propylene oxide polyether polyol, having an OH number of about 112, a functionality of about 2 and a molecular weight of about 1000.

Polyol 2: a propylene glycol started propylene oxide/ethylene oxide (80:20 wt.ratio) polyether polyol, having an OH number of about 28, a functionality of about 2 and a molecular weight of about 4000.

Polyol 3: 1,4-butanediol.

Baylith L Paste: a mixture of synthetic alumino-silicate in castor oil.

Dow Corning Antifoam 1400: 100% silica-filled polydimethyl siloxane, an FDA approved antifoaming agent used to prevent foam in food and chemical processes.

Catalyst A: a dibutyltin dilaurate catalyst, commercially available as Dabco T-12 from Air Products and Chemical Inc. Allentown, PA.

The following polyol blend was used in the examples:

Polyol Blend A comprised:
52.43 pbw Polyol 1
28.23 pbw Polyol 2
10.08 pbw Polyol 3
9.07 pbw Baylith Paste L
0.13 pbw Dow Corning Antifoam 1400
0.005 pbw Catalyst A Polyol Blend A was characterized by an equivalent weight of 281.

The polyurethane castings in Examples 1–4, as set forth in Table 1, were prepared according to the following procedure:

The polyol blend and the isocyanate were hand mixed at 25–30° C. for 1.5–2.0 minutes, and then cast into a 105–110° C. book-case mold which measured 8 in.×16 in.×0.125 in. and into button molds (also pre-heated to 105–110° C.). The cast samples were allowed to cure at 105–110° C. in the molds for 16 hours, before being demolded. After 1 week at room temperature in a temperature and humidity-controlled environment, the samples were tested for various physical and mechanical properties. The results are set forth in Table 1 below.

TABLE 1

Examples Using Linear Polyol Blend A: Example 1 is comparative

|  | Example 1 | Example 2 | Example 3 | Example 4 |
|---|---|---|---|---|
| Polyol Blend A (grams) | 250 | 250 | 250 | 250 |
| Isocyanate B (grams) | 170.7 | 136.56 | 85.35 | 34.14 |
| Isocycanate C (grams) |  | 34.14 | 85.35 | 136.56 |
| Freezing Point Isocyanate Blend (° C.) | 15 | 12 | 9 | 5 |
| NCO:OH Ratio | 1.05 | 1.05 | 1.05 | 1.05 |
| Tensile Strength (psi) | 2124 | 1877 | 2039 | 2082 |
| 100% Modulus (psi) | 829 | 842 | 790 | 683 |
| Elongation (%) | 331 | 306 | 351 | 380 |
| Die C Tear (pli) | 258 | 240 | 247 | 221 |
| Split Tear (pli) | 84 | 100 | 102 | 97 |
| Hardness Shore A (1 sec/5 sec) | 84/83 | 85/84 | 82/81 | 83/82 |
| Compression Set | 33.3 | 37.6 | 53.5 | 57.1 |
| Taber Abrasion (wt. loss in mg/1000 cycles) | 108 | 98 | 98 | 94 |

According to the invention the freeze stability of the isocyanate blends in Examples 2–4 improves with increasing amounts of Isocyanate C. Pure Isocyanate B, as used in Example 1, has a freezing point of 15° C., the isocyanate blend used in Example 4 is freeze stable to 5° C. Physical properties of resulting cast elastomers prepared from Isocyanate B, and blends of Isocyanate B and Isocyanate C are similar.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A liquid polyisocyanate composition characterized by improved freeze stability, and having an NCO group content of from 15 to 30%, containing less than 90% by weight of diphenylmethane diisocyanate, and comprising a blend of
    (A) 10 to 90% by weight, based on 100% by weight of (A) and (B), of an MDI adduct having an NCO group content of 15 to 30%, which comprises the reaction product of:
        (1) diphenylmethane diisocyanate containing from about 0 to about 20% by weight of the 2,4'-isomer, from about 0 to about 2% by weight of the 2,2'-isomer and the balance being the 4,4'-isomer, with
        (2) a low molecular weight branched aliphatic dihydroxy compound containing two hydroxyl; and
    (B) 10 to 90% by weight, based on 100% by weight of (A) and (B), of an allophanate-modified MDI, having an NCO group content of 12 to 32.5%, and comprising the reaction product of:
        (1) diphenylmethane diisocyanate containing from about 0 to about 20% by weight of the 2,4'-isomer, from about 0 to about 2% by weight of the 2,2'-isomer and the balance being the 4,4'-isomer, and
        (2) an aliphatic alcohol.

2. The polyisocyanate composition of claim 1, wherein the NCO group content is from 20 to 26% by weight and the diphenylmethane diisocyanate content is less than 70% by weight.

3. The polyisocyanate composition of claim 2, which comprises a blend of
    (A) from 10 to 70% by weight, based on 100% by weight of (A) and (B) of an MDI adduct having an NCO group content of 15 to 30% by weight, and
    (B) from 30 to 90% by weight, based on 100% by weight of an allophanate-modified MDI having an NCO group content of 12 to 32.5% by weight.

4. The polyisocyanate composition of claim 3, wherein (A) comprises the reaction product of:
    (1) diphenylmethane diisocyanate containing from about 0 to 10% by weight of the 2,4'-isomer, from about 0 to about 1% by weight of the 2,2'-isomer and the balance being the 4,4'-isomer, and
    (2) said low molecular weight branched aliphatic dihydroxy compound containing two hydroxyl groups comprises a poly-1,2-propylene ether glycol having a molecular weight of from 134 to 700.

5. The polyisocyanate composition of claim 4, wherein (A) comprises the reaction product of:
    (1) diphenylmethane diisocyanate containing from about 0 to about 3% by weight of the 2,4'-isomer, from about 0 to 0.02% by weight of the 2,2'-isomer and the balance being the 4,4'-isomer, and
    (2) said low molecular weight branched aliphatic dihydroxy compound is selected from the group consisting of dipropylene glycol, tripropylene glycol , polypropylene glycol and mixtures thereof.

6. The polyisocyanate composition of claim 1, wherein (A)(2) comprises tripropylene glycol.

7. The polyisocyanate composition of claim 1, wherein (B) said allophanate-modified MDI has an NCO group content of 20 to 26%.

8. The polyisocyanate composition of claim 7, wherein (B)(1) said allophanate-modified MDI comprises the reaction product of:
   (1) diphenylmethane diisocyanate containing from about 0 to about 20% by weight of the 2,4'-isomer, from about 0 to about 1% by weight of the 2,2'-isomer and the balance being the 4,4'-isomer, and
   (2) an aliphatic alcohol having from about 1 to about 36 carbon atoms.

9. The polyisocyanate composition of claim 8, wherein (B) comprises the reaction product of:
   (1) diphenylmethane diisocyanate containing from about 0 to about 3% by weight of the 2,4'-isomer, from about 0 to about 0.2% by weight of the 2,2'-isomer and the balance being the 4,4'-isomer, and
   (2) an aliphatic alcohol having from about 4 to about 16 carbon atoms.

10. The polyisocyanate composition of claim 9, wherein (B)(2) said aliphatic alcohol comprises isobutanol.

11. The polyisocyanate composition of claim 1, having an NCO group content of from 20 to 26%, containing less than 70% by weight of diphenylmethane diisocyanate, and comprising a blend of:
   (A) 20 to 50% by weight, based on 100% by weight of (A) and (B), of an MDI adduct having an NCO group content of 15 to 30%, and
   (B) 50 to 80% by weight, based on 100% by weight of (A) and (B), of an allophanate-modified MDI having an NCO group content of 12 to 32.5%.

12. A process for preparing stable liquid polyisocyanate compositions having an NCO group content of from 15 to 30% and containing less than 70% by weight of diphenylmethane diisocyanate, comprising:
   (I) blending
      (A) from 10 to 90% by weight, based on 100% by weight of (A) and (B), of an MDI adduct having an NCO group content of 15 to 30% by weight, and comprising the reaction product of
         (1) diphenylmethane diisocyanate containing from about 0 to 20% by weight of the 2,4'-isomer, from about 0 to 2% by weight of the 2,2'-isomer and the balance being the 4,4'-isomer, and
         (2) a low molecular weight branched aliphatic dihydroxy compound, and
      (B) 10 to 90% by weight, based on 100% by weight of (A) and (B), of an allophanate-modified MDI having an NCO group content of 12 to 32.5% by weight, and comprising the reaction product of:
         (1) diphenylmethane diisocyanate containing from about 0 to about 20% by weight of the 2,4'-isomer, from about 0 to about 2% by weight of the 2,2'-isomer and the balance being the 4,4'-isomer, and
         (2) an aliphatic alcohol.

* * * * *